ALARM CLOCK ELECTRICALLY CONNECTED TO TELEPHONE BELL

Filed May 14, 1963

INVENTOR.
MILDRED J. JACKSON

BY Kimmel & Crowell
ATTORNEYS.

3,294,910
Patented Dec. 27, 1966

3,294,910

ALARM CLOCK ELECTRICALLY CONNECTED TO TELEPHONE BELL

Mildred J. Jackson, 549 W. Allen St., Springfield, Ill. 62704

Filed May 14, 1963, Ser. No. 280,367
12 Claims. (Cl. 179—2)

This invention relates to a telephone alarm device and more particularly to a means for operating the bell of a telephone receiver from a source of alternating current at a predetermined time set into a timer or clock means.

As conducive to a better understanding of this invention, it is conventional in many homes for a telephone receiver to be readily accessible to a sleeping person, an extension frequently being positioned on a night table immediately adjacent the bed. Heretofore, it has been necessary that a separate alarm system, such as an alarm clock or a radio alarm be provided to waken the sleeper at a predetermined time. It would be most advantageous if an alarm system could be incorporated into the telephone receiver utilizing the bell or ringer means integral therewith to audibly inform the sleeper that the time that he has chosen to awaken himself has arrived.

It is, therefore, a primary object of this invention to provide a means for use in combination with a conventional telephone receiver to automatically actuate the bell system at a predetermined time.

Another object of this invention is the provision of circuitry actuated by a cam operated switch driven by a conventional clock or timer motor for ringing the bell at the desired time.

It is well known that in many cities a central exchange is adapted to automatically ring the bell of an individual telephone receiver when the cradle switch is opened by placing the handset on the base after a predetermined dialing signal is sent to the exchange. This can be accomplished by lifting the handset and actually dialing the specific number and then replacing the handset on the base or, alternately, can be accomplished by opening and closing the talking circuit by quickly making and breaking the circuitry across the cradle switch according to the predetermined sequence.

It is, therefore, a further object of this invention to provide a means for automatically closing the talking circuit while the handset is still seated on the base, sending the predetermined signal to the central exchange, and subsequently opening the circuitry across the cradle switch to allow the bell or ringer system to be actuated as explained hereinabove.

A still further object of this invention is the provision of a means of the type described further including a tape recorded message automatically transmitted when the awakened sleeper lifts the handset in response to the ringing of the bell.

Yet another object of this invention is to provide circuitry including a time delay means which bypasses the cam operated switch to allow the sleeper to reset the mechanism to again ring the bell in a specified relatively short period of time.

A further object of this invention is to provide circuitry for automatically opening the conventional ringer circuit at a predetermined time and directly connecting the bell to a source of alternating current for ringing the same to awaken the sleeper.

Other and further objects reside in the combinations of elements, arrangements of parts, and features of construction.

Still other objects will be in part be obvious and in part be pointed out as the description of the invention proceeds and as shown in the accompanying drawing wherein.

Similar reference characters refer to similar parts throughout the several views of the drawing.

Figure 1:
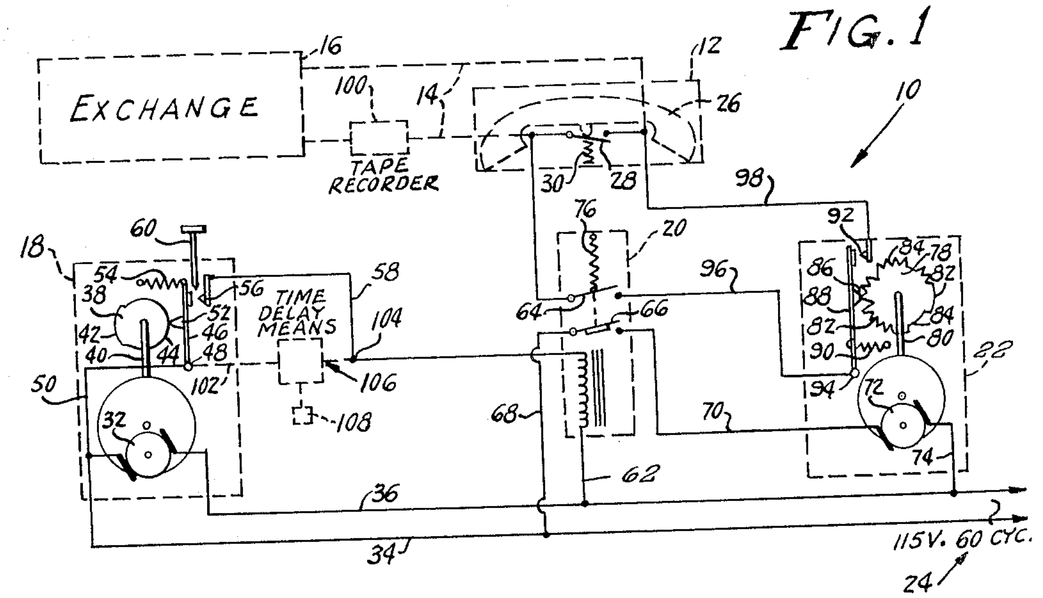
FIGURE 1 is a schematic circuit diagram of one embodiment of a telephone alarm system or device in accordance with the instant inventive concept.

Referring now to the drawing and more particularly to FIGURE 1, one form of a telephone alarm device in accordance with this invention is indicated generally by the reference numeral 10 and comprises basically a telephone receiver set 12 conductively connected by a conventional talking circuit 14 to a central exchange 16, a first cam operated switch 18, a relay means 20, a second cam operated switch 22, and a source of alternating current 24.

Telephone receiver set 12 includes a conventional handset indicated at 26 as seated on a conventional cradle switch 28 normally biased to a closed position by a spring means 30 but maintained open when the handset 26 is seated on the base (not shown).

The first cam operated switch 18 includes a conventional clock or timer motor 32 conductively connected by leads 34 and 36 to the source 24 and continuously driven thereby. A first cam means 38 is driven by a mechanical connection 40 from the clock motor 32 and has a first camming surface including a high dwell portion 42 and a low dwell portion 44. A first switch arm 46 is formed of a flexible conductive material, such as spring steel or the like, and is conductively connected at 48 through a lead 50 to one terminal of the source 24 through the lead 34. An outstanding portion 52 of the first switch arm 46 is maintained in contact with the camming surface of the first cam means 38 by a spring means 54. A first contact means 56 is conductively connected to the relay means 20 through lead 58 and is spaced from the first switch arm 46 when the low dwell portion 44 of the first cam means 38 engages the outstanding portion 52 and is in conductive contact with the first switch arm 46 when the high dwell portion 42 of the first cam means 38 engages the same. A non-conductive manually operable switch element 60 is interposable between the first switch arm 46 and the first contact means 56 to break or prevent contact between these elements.

The opposite side of the relay means 20 is conductively connected through the lead 62 to the other terminal of the source 24 secured to lead 36. The relay means 20 includes a double pole, single throw switch having one pole 64 across the circuit of a cradle switch 28 and a second pole 66 interposed in a circuit formed by lead 68 conductively connected to lead 34 of the source 24 and lead 70 secured to an auxiliary motor means 72 forming part of the second cam operated switch 22, the opposite side of the auxiliary motor 72 being conductively connected to the other terminal of the source 24 through the lead 74 secured to the lead 36. The pole 64 and 66 are normally biased to an open position by spring means 76 and are closed when the relay means 20 is energized through the circuit formed by closing the first cam operated switch 18.

The auxiliary motor means 72 drives a second cam means 78 through the mechanical connection 80. The second cam means 78 has a camming surface with a plurality of high dwell portions 82 and a plurality of low dwell portions 84 engaging an outstanding portion 86 of a second flexible switch arm 88 biased by spring means 90. A second contact means 92 is spaced from the second switch arm 88 when the outstanding portion 86 engages one of the high dwell portions 82 of the second cam means 78 and is in conductive contact with the second switch arm 88 when the outstanding portion 86 engages one of the low dwell portions 84 of the second cam means 78. The second switch arm 88 is conductively connected at 94 through the lead 96 to the opposite side of the one pole 64 and the second contact means 92 is conductively connected through the lead 98 to the opposite side of the cradle switch 28.

The use and operation of the device shown in FIGURE 1 will now be apparent. The first cam operated switch 18 is set in a conventional manner similar to an ordinary alarm clock to have the high dwell portion 42 of the first cam means 38 engage the outstanding portion 52 of the first switch arm 46 at a particular time. When this occurs the energizing circuit to the relay means 20 is automatically closed and the poles 64 and 66 are withdrawn to their make position. The closing of the one pole 64 bypasses the cradle switch 28 shorting the same out and closing the telephone talking circuit 14 to receive the dial tone as if the handset 26 were lifted from the base. Simultaneously, the second pole 66 activates the auxiliary motor means 72 to drive the second cam means 78 alternately opening and closing the second cam operated switch 22 which opens and closes the talking circuit 14 according to a predetermined signal to achieve the same result as dialing the particular number at the central exchange 16 adapted to ring the bell (not shown) of the telephone receiver 12. The first cam means 38 is so timed as to make one revolution and thereby keep the relay means 20 energized long enough to permit the second cam operated switch 22 to complete the dialing action. As soon as this is acomplished the low dwell portion 44 of the first cam means 38 engages the outstanding portion 52 of the first switch arm 46 to open or break the circuit to the relay means 20 thereby opening the poles 64 and 66 and allowing the cradle switch 28 to again control the talking circuit 14 in the conventional manner. This is the same result as would be achieved by hanging up the handset 26 which would allow the conventional mechanism at the central exchange 16 to ring the telephone bell. The bell will continue to ring until the handset 26 is lifted from the cradle switch 28 to open the bell circuit.

It is contemplated as a part of the instant inventive concept to operatively connect a tape recorder 100 in a conventional manner in the talking circuit 14 at the central exchange 16 so that when the handset 26 is lifted in response to the ringing of the bell, a predetermined message or statement is transmitted through the telephone receiver 12, such as a statement to the effect that it is time to arise.

It is also within the instant invention to provide a normally open bypass circuit 102 between the point 48 and the point 104 leading to the relay means 20 for bypassing the first cam operated switch 18 and directly conductively connecting the relay means 20 to the source 24. A time delay means 106 of a conventional type, such as a bimetallic heat operated switch or the like would be included in the bypass circuit 102 which would delay the energizing of the relay means 20 for a predetermined time after the bypass circuit 102 has been closed by a manual means indicated at 108. This system would be similar to the conventional delayed alarm system provided on many radio alarms to allow the sleeper to push a button and reset the mechanism to repeat the alarm after a predetermined time interval, such as 5, 10, or 15 minutes. Obviously, the same bypass circuit may be used in the circuit of FIGURE 2 now to be described.

Figure 2:
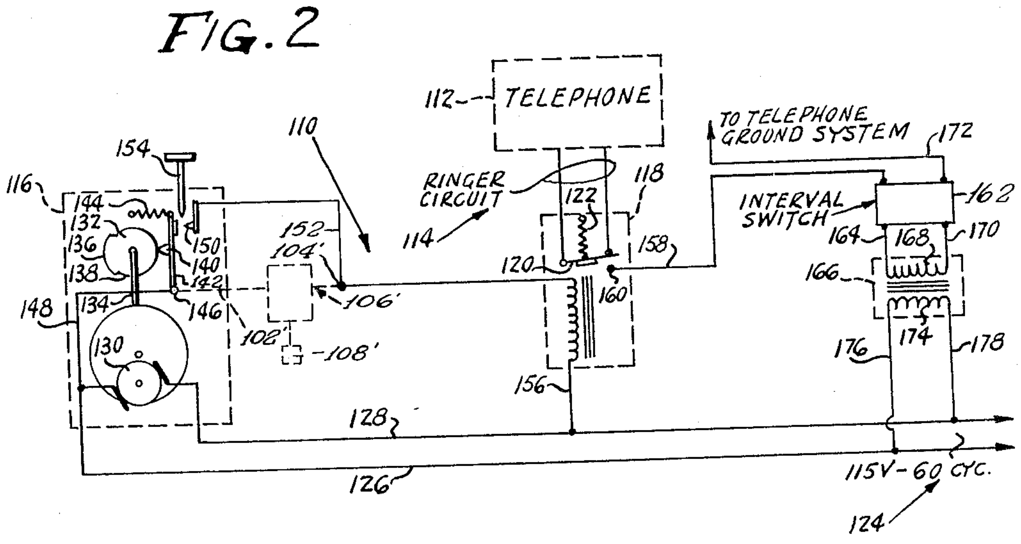
FIGURE 2 is a schematic circuit diagram of a modified form of telephone alarm device.

An alternate or additional device for utilizing a telephone as an alarm means is illustrated in FIGURE 2 and is designated generally by the reference numeral 110. This system includes a conventional telephone receiver set 112 connected to a central exchange (not shown) and including a conventional ringer circuit 114 also operatively connected in a manner well known to the prior art. A first cam operated switch 116 similar to the cam operated switch 18 of the embodiment of FIGURE 1 energizes a relay means 118 including a single pole double throw switch 120 normally biased to close the ringer circuit 114 by spring means 122 but moved to break the ringer circuit 114 and make a transformer circuit to be further described hereinafter when the relay means 118 is energized. A conventional source of alternating current is indicated at 124 and includes leads 126 and 128 connected to opposite terminals of the clock motor 130 which drives the first cam means 132 through the mechanical connection 134. The first cam means 132 has a camming surface with a high dwell portion 136 and a low dwell portion 138 engaging an outstanding portion 140 of a first switch arm 142 spring biased at 144 and conductively connected at 146 through lead 148 to the lead 126 of the alternating current source 124. A first contact means 150 is conductively connected through lead 152 to the relay means 118 and a manually operable non-conductive switch element 154 is provided for the same purpose as the switch element 60 in the embodiment of FIGURE 1. The time delay means indicated by elements 102′, 104′, 106′ and 108′ may be inserted in the manner previously described with respect to FIGURE 1. The opposite side of the relay means 118 is conductively connected by the lead 156 to the lead 128 of the source 124.

The transformer circuit includes a lead 158 passing from a contact 160 engaged by the single pole double throw switch 120 when the relay means 118 is energized to a conventional interval interrupter switch 162. Lead 164 extends from the interval switch 162 to a transformer means 166 passing through the secondary coil 168 thereof and returning through lead 170 to the interval switch 162. A further lead 172 conductively connects the interval switch 162 to the telephone system ground which is conventionally a portion of the bell or ringer in the telephone receiver set 112. The transformer means 166 includes a primary coil 174 having leads 176 and 178 connected to the leads 126 and 128, respectively, of the source 124.

The use and operation of the device of the instant invention as embodied in FIGURE 2 will now be readily apparent. Similar to the embodiment of FIGURE 1, a predetermined time is set in the electric clock motor 130 to activate the alarm circuit and to present the high dwell portion 136 of the camming surface of the first cam means 132 to the outstanding portion 140 of the first switch arm 142 to close the circuit through the first contact means 150 to energize the relay means 118 thereby moving the pole 120 to break the ringer circuit 114 and to close the transformer circuit. This allows current to flow through the transformer means 166 which is so designed as to substantially match the voltage of the source 124 to the bell (not shown). The interval switch 162 provides intermittent ringing such as is achieved by the use of the normal ringer current in any conventional manner, such as by a bimetallic heating element which closes the circuit for a predetermined time and then alternately opens and closes it to interrupt the ringing. The system is de-activated by closing the manual switch element 154 to open the circuit to the relay means 118 thereby restoring the ringer circuit 114 to normal operation.

Power to drive the component parts of the systems of either of FIGURES 1 or 2 is obtained from a normal convenience outlet or may be provided by adding one additional conductor to the conventional telephone distribution system.

Figure 3:
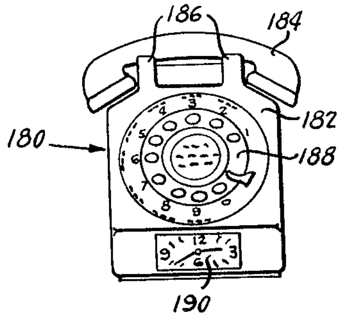
FIGURE 3 is a front elevational view of one form of a conventional telephone receiver set modified in accordance with the instant invention to include a clock or timer means therein.

An illustrative embodiment of a telephone handset incorporating the inventive concept of the instant application is designated generally by the reference numeral 180 in FIGURE 3 and includes a base 182, a handset 184 seated on the cradle 186, a dialing mechanism 188, and a clock 190 incorporated into the base 182. It is to be understood that although the clock 190 has been shown at the foot of the base 182, it may be readily positioned elsewhere, such as adjacent the cradle 186 or even in the handset 184, if desired. Also, although a conventional telephone receiver set has been illustrated in FIGURE 3, it is to be understood that the instant inventive concept may be readily incorporated into telephone handsets having housing of other shapes and sizes, such as conventional wall sets or the Princess set currently on the market.

Telephone companies could furnish the service provided by the device of the instant invention on a subscriber basis. Neighbor phones on a party line would not be rung since different ringer frequencies can be furnished from the central exchange. Any extension phones on a subscriber's line would automatically ring unless special arrangements within the scope of the presently available equipment were made.

It will now be seen that there is herein provided an improved telephone alarm device which satisfies all the objectives of the instant invention, and others, including many advantages of great practical utility and commercial importance.

Since many embodiments may be made of the instant inventive concept, and since many modifications may be made in the embodiments hereinbefore shown and described, it is to be understood that all matter herein is to be interpreted merely as illustrative, and not in a limiting sense.

I claim:

1. In combination, a telephone receiver having a bell and a bell circuit, an electric clock motor operatively connected to a voltage source, a first cam-operated switch continuously driven by the clock motor, a relay including switching means, an energizing circuit for said relay through the first cam-operated switch, circuit means including the relay switching means operatively connected through the telephone receiver bell to ring the same when the relay is energized, a normally open by-pass circuit in said energizing circuit for by-passing said first cam-operated switch and directly conductively connecting said relay means to said source, manually operated means to close said by-pass circuit, a time delay means operatively connected in said by-pass circuit to delay the energizing of said relay means for a predetermined time.

2. In combination, a telephone receiver having a bell and a bell circuit, an electric clock motor operatively connected to a voltage source, a first cam-operated switch continuously driven by the clock motor, a relay including switching means, an energizing circuit for said relay through the first cam-operated switch, circuit means including the relay switching means operatively connected through the telephone receiver bell to ring the same when the relay is energized, a talking circuit normally maintained open by the handset of the telephone receiver engaging a cradle switch, said telephone receiver being operatively connected to a central exchange adapted to automatically ring said bell when said cradle switch is open after a predetermined dialing signal is sent through said talking circuit with said cradle switch closed, said local circuit means including a normally open double pole, single pole switch, said poles being closed when said relay means is energized, one of said poles, when closed, shorting out said cradle switch and closing said talking circuit, an auxiliary motor means, a second cam-operated switch in said talking circuit driven by said auxiliary motor means to alternately open and close said talking circuit to send said predetermined dialing signal to said central exchange, the other of said poles, when closed, driving said motor means, said first cam-operated switch being timed to open said energizing circuit after said cam-operated switch has completed the sending of said signal whereby said relay means is de-energized thereby opening said double pole, single throw switch and allowing the cradle switch to control the talking circuit.

3. A structure in accordance with claim 2 wherein a recorder means is operatively connected in said talking circuit at said main exchange, said recorder means being adapted to transmit a prearranged statement through said telephone receiver when said cradle switch is closed by lifting said handset after the bell is rung.

4. A structure in accordance with claim 2 wherein said second cam-operated switch includes a second switch arm conductively connected to one side of said talking circuit, second cam means driven by said auxiliary motor means, said second cam means having a second camming surface engaging a portion of said second switch arm, said second camming surface having a plurality of high dwell portions and a plurality of low dwell portions corresponding to said predetermined dialing signal, a second contact means conductively connected to the other side of said talking circuit, said second contact means being spaced from said second switch arm when one of said low dwell portions engages said second switch arm, and being in conductive contact with said second switch arm when one of said high dwell portions engages said second switch arm.

5. A structure in accordance with claim 4 wherein a recorder means is operatively connected in said talking circuit at said main exchange, said recorder means being adapted to transmit a prearranged statement through said telephone receiver when said cradle switch is closed by lifting said handset after the bell is rung.

6. In combination, a telephone receiver having a bell and a bell circuit, an electric clock motor operatively connected to an A.C. voltage source, a first cam-operated switch operatively connected to and driven by the electric clock motor, a relay, an energizing circuit for the relay through the first cam operated switch, a local circuit for said relay including means normally closing the ringer circuit when the relay is de-energized, circuit means conductively connecting the bell to a voltage source including the means normally closing the ringer circuit for opening the ringer circuit and closing the circuit connecting the bell to the voltage source when the relay is energized.

7. The structure of claim 6 further including an interval switching means operatively connected in the circuit connecting the bell to the voltage source to ring the bell intermittently.

8. The structure of claim 6 wherein the means normally closing the ringer circuit when the relay is de-energized is a single pole, double throw switch, said pole being in a first position normally closing the ringer circuit when the relay is de-energized, and wherein the voltage source for ringing the bell includes a transformer for matching the voltage of the A.C. voltage source and the bell, said pole being moved to a second position opening said ringer circuit and closing said transformer circuit when the relay is energized.

9. A structure in accordance with claim 8 wherein an interval switch is operatively connected in said transformer circuit to ring the bell intermittently.

10. A structure in accordance with claim 6 further including the maunally operated switch to open said cam-operated switch.

11. A structure in accordance with claim 6 wherein said first cam-operated switch includes a first switch arm conductively connected to one terminal of said source, first cam means continuously driven by said clock motor, said first cam means having a first camming surface engaging a portion of said first switch arm, said first camming surface having a high dwell portion and a low dwell portion, a first contact means conductively connected to said relay means, said first contact means being spaced from said first switch arm when said low dwell portion engages said first switch arm, and being in conductive contact with said first switch arm when said high dwell portion engages said first switch arm, and said relay means being conductively connected with the other terminal of said source.

12. A structure in accordance with claim 11 further including a manually operated non-conductive switch member interposable between said first switch arm and said first contact means.

References Cited by the Examiner

UNITED STATES PATENTS

| | | | |
|---|---|---|---|
| 572,220 | 12/1896 | Scribner | 340—328 |
| 2,642,490 | 6/1953 | Capehart et al. | |
| 3,124,650 | 3/1964 | Rostad | 179—5 |
| 3,131,260 | 4/1964 | Evans | 179—5 |

DAVID G. REDINBAUGH, *Primary Examiner.*

JOHN W. CALDWELL, *Examiner.*

J. T. STRATMAN, *Assistant Examiner.*